US007347082B1

(12) United States Patent
Kohn

(10) Patent No.: US 7,347,082 B1
(45) Date of Patent: Mar. 25, 2008

(54) METHOD AND APPARATUS FOR TESTING VEHICLE FUEL SYSTEM INTEGRITY

(75) Inventor: Bruce R Kohn, Tucson, AZ (US)

(73) Assignee: SysTech International, LLC, Ann Arbor, MI (US)

( * ) Notice: Subject to any disclaimer, the term of this patent is extended or adjusted under 35 U.S.C. 154(b) by 145 days.

(21) Appl. No.: 11/068,288

(22) Filed: Feb. 28, 2005

Related U.S. Application Data

(60) Provisional application No. 60/548,078, filed on Feb. 26, 2004.

(51) Int. Cl.
*G01M 3/26* (2006.01)

(52) U.S. Cl. ............................ 73/40; 73/49.2; 73/49.7

(58) Field of Classification Search .................... 73/40, 73/49.2, 49.7, 118.1, 119 R
See application file for complete search history.

(56) References Cited

U.S. PATENT DOCUMENTS 5,020,362 A 6/1991 Hart et al.
5,369,984 A 12/1994 Rogers et al.
5,390,645 A 2/1995 Cook et al.
5,561,240 A 10/1996 Ochiai et al.
5,883,301 A 3/1999 Filippi et al.
5,898,103 A 4/1999 Denz et al.
6,116,082 A * 9/2000 Pride ....................... 73/40.5 R
6,182,642 B1 2/2001 Ohkuma
6,298,712 B1 10/2001 Docy et al.
6,523,398 B1 2/2003 Hanai et al.
6,615,808 B2 9/2003 Streib
6,644,100 B2 11/2003 Fritz et al.
2002/0100314 A1 * 8/2002 Docy et al. .................. 73/49.2

* cited by examiner

*Primary Examiner*—Daniel S. Larkin
(74) *Attorney, Agent, or Firm*—Van Dyke, Gardner, Linn & Burkhart, LLP

(57) ABSTRACT

A method and apparatus for measuring leakage of a vehicle fuel system includes providing an apparatus having a gas source, a pressure meter and a reference orifice and connecting the apparatus to the fuel system. The fuel system is pressurized with the source. A first set of pressure measurements is obtained using the pressure meter with gas escaping the fuel system through leakage of the fuel system. A second set of pressure measurements is obtained with gas escaping the fuel system through leakage of the fuel system and through the reference orifice. An effect of fuel vapor pressure created by fuel in the vehicle fuel system may be measured. A leakage parameter of the fuel system may be calculated from the first and second sets of pressure measurements including compensating for the effect of fuel vapor pressure.

23 Claims, 2 Drawing Sheets

METHOD AND APPARATUS FOR TESTING VEHICLE FUEL SYSTEM INTEGRITY

CROSS REFERENCE TO RELATED APPLICATIONS

This application claims priority from U.S. provisional patent application Ser. No. 60/548,078, filed on Feb. 26, 2004, the disclosure of which is hereby incorporated herein by reference in its entirety.

BACKGROUND OF THE INVENTION

The present invention provides a method and apparatus for testing vehicle fuel system integrity and, in particular, to testing the vehicle fuel system with combustible fuel in the fuel system tank. The invention obtains a leakage parameter, such as size of the leak opening, leak rate, or the like.

The ability to detect the proper functioning of a vehicle's fuel tank system is necessary for controlling the emissions of VOCs into the environment. EPA issued a procedure for determining the pass/fail status of a vehicle's fuel tank integrity, but did not take into account the variation in results due to different vapor space volumes.

A real vehicle with fuel is subject to a contribution of mass from the evaporation of fuel in the tank. This contribution affects the system by replacing mass lost to a leak and, thus, masking the ability to detect a leak. It is well known in the field that this may theoretically be compensated for by characterizing the vapor pressure of various fuels at various temperatures. However, the fuel blend is not usually known, is effected by age, and the rate of vapor contribution is effected by the geometry of the system, which may also not be known. Thus, this effect was generally not taken into account in known procedures.

SUMMARY OF THE INVENTION

The present invention addresses the above problems by pressurizing the tank and comparing the measured pressure change of the tank with and without a reference orifice included in the volume space. Any influences on leakage flows, such as gas density and temperature, affect both the tank leak as well as the reference leak so the ratio represents the characteristics of the leak and not these variables including vapor space. The present invention solves the problem of compensating for the contribution of mass from the evaporation of fuel in the tank by measuring its effects.

A method and apparatus for measuring leakage of a vehicle fuel system, according to an aspect of the invention, includes providing an apparatus having a gas source, a pressure meter and a reference orifice and connecting the apparatus to the fuel system. The fuel system is pressurized with the source. A first set of pressure measurements is obtained using the pressure meter with gas escaping the fuel system through leakage of the fuel system. A second set of pressure measurements is obtained with gas escaping the fuel system through leakage of the fuel system and through the reference orifice. A leakage parameter of the fuel system is calculated from the first and second sets of pressure measurements.

A method and apparatus for measuring leakage of a vehicle fuel system, according to another aspect of the invention, includes providing a reference orifice. A first set of pressure measurements is made during pressure change of said fuel system without the reference orifice connected with said fuel system. A second set of pressure measurements is made during pressure change of said fuel system with the reference orifice connected with said fuel system. An effect of fuel vapor pressure created by fuel in the vehicle fuel system is measured. A leakage parameter of the fuel system is calculated from the first and second sets of pressure measurements including compensating for the effect of fuel vapor pressure.

A method and apparatus for measuring leakage of a vehicle fuel system, according to yet another aspect of the invention includes providing an apparatus having a gas source, a pressure meter and a reference orifice and connecting said apparatus to the fuel system. The fuel system is pressurized with the source to a particular pressure. A first set of pressure measurements is obtained with the pressure meter with either (i) gas escaping through leakage of the fuel system or (ii) gas escaping through leakage of the fuel system and through said reference orifice. The fuel system is returned to the particular pressure after obtaining the first set of pressure measurements. A second set of pressure measurements is obtained with the other of (i) gas escaping through leakage of the fuel system alone or (ii) gas escaping through leakage of the fuel system and through said reference orifice. A leakage parameter of the fuel system is calculated from the first and second sets of pressure measurements.

These and other objects, advantages and features of this invention will become apparent upon review of the following specification in conjunction with the drawings.

DETAILED DESCRIPTION OF THE PREFERRED EMBODIMENT

Figure 1:
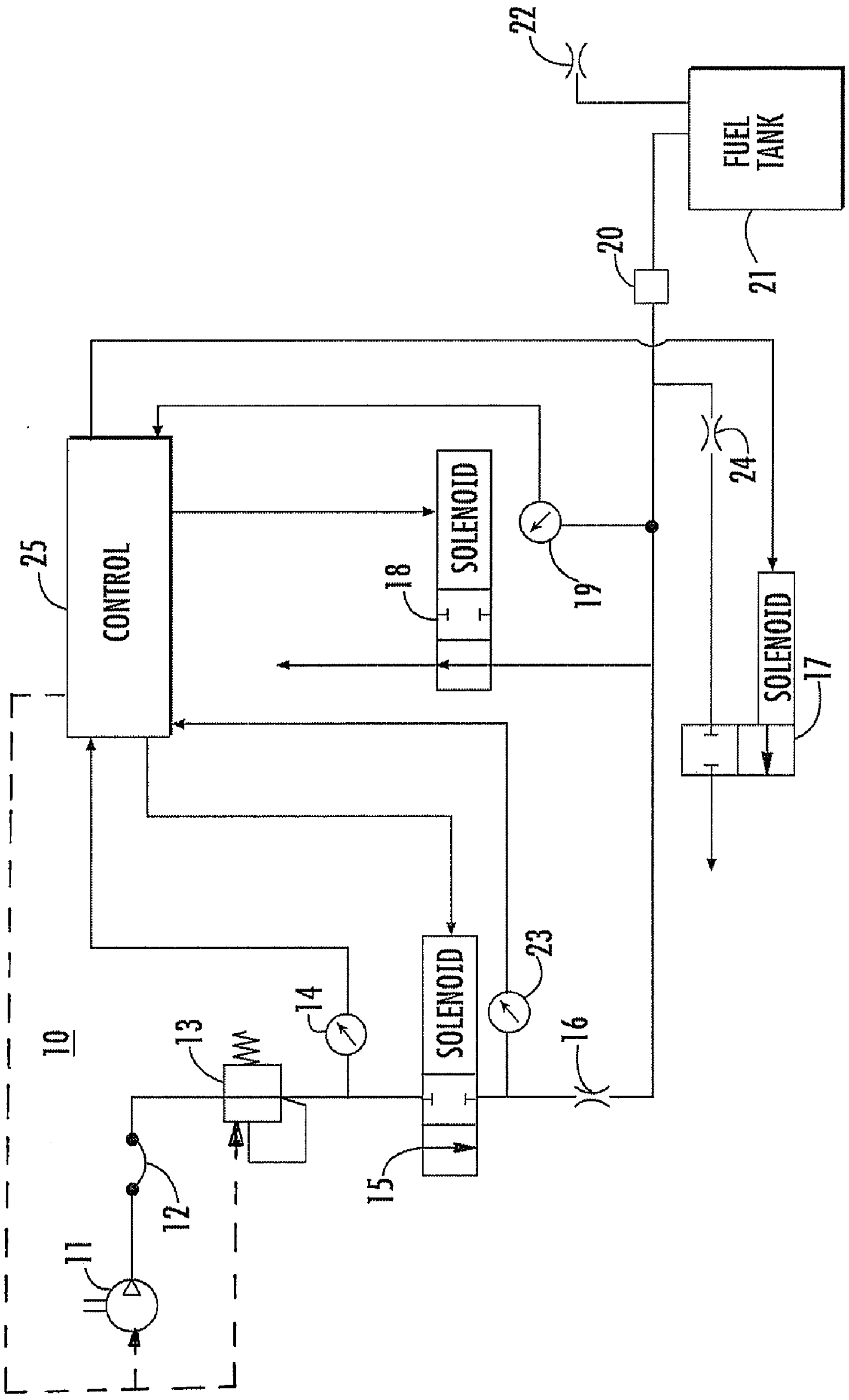
FIG. 1 is a schematic representation of the apparatus utilized in this invention.
Figure 2:
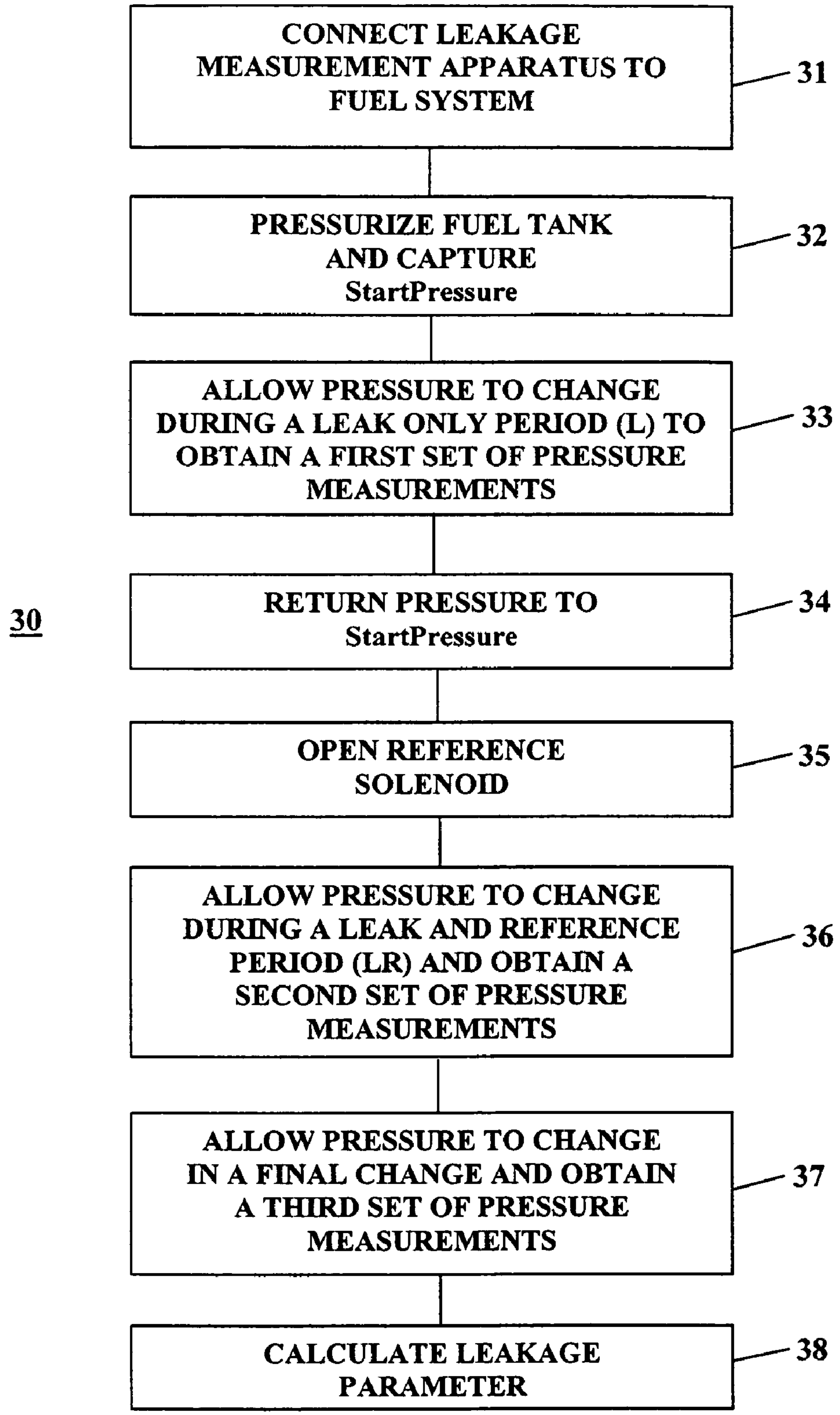
FIG. 2 is a diagram of a method of measuring leakage of a vehicle fuel system according to the invention.

Referring now to the drawings and the illustrative embodiments depicted therein, a leakage measurement apparatus 10 is shown in FIG. 1 for use with a vehicle fuel system fuel tank 21 with a possible leak 22. The fuel system is tested by attaching a filler neck adapter 20 of the apparatus to the vehicle fuel filler neck. Pressurized air is supplied in this embodiment from compressor 11 through flexible hose 12, but may also be supplied by a local air pump or using other pneumatic plumbing. To ensure that the operating conditions are consistent, the preferred embodiment uses regulator 13 to maintain the supply pressure to the apparatus.

The vehicle fuel tank is pressurized by controlling a supply solenoid 15 with a control 25 according to a fill algorithm that monitors the tank pressure with plenum pressure sensor 19. A supply pressure sensor 14 is monitored by control 25 for safety warnings and for measurements needed if fill volume is used for optional calculation of vapor space volume within tank 21, as will be discussed below. Fill volume is a function of time, pressure, temperature, as measured with an optional temperature sensor (not shown), and the size of fill orifice 16. Control 25 may additionally control compressor 11 and/or pressure regulator 13, if desired.

The method for quantifying a leakage parameter of the fuel tank, such as effective leak diameter or leak rate, is accomplished by the leak rate being measured with and without a reference solenoid 17 allowing flow through a reference orifice 24. Of course, both measurements include any leak, illustrated at 22, that might be present in the vehicle tank equipment. A drain solenoid 18, also controlled by control 25, allows the plenum to be rapidly depressurized, such as at the end of the test, or if the test is to be interrupted, or the like.

A method 30 for measuring leakage of a vehicle fuel system begins at step 31 by connecting apparatus 10 to the filler neck of the fuel tank of the vehicle. The fuel tank may be at least partially filled with fuel, as would be encountered during normal use of a vehicle being inspected. Hoses leading from tank 21 may be closed off, using hose clamps, or the like. The tank is pressurized at step 32 to a target pressure, such as 15" $H_2O$. The duration and pressure versus time curve of the fill procedure may provide volume cues that may be used during other portions of the procedure as will be discussed below. The pressure may be maintained by filling or releasing pressure for a period of time to allow any pressure volume work effects, such as fuel effects, to dissipate. This is typically forty seconds and may be adjusted to larger values for larger tank volumes. If the pressure is less than the target pressure, in the illustrated embodiment, being 15" $H_2O$, then the supply of pressurized air is flowed from source 11 until 15" $H_2O$ is reached. Once this level is reached, source 11 is disconnected by closing supply solenoid valve 15. A StartPressure parameter is captured by control 25 by taking a reading from pressure sensor 19.

The pressure in tank 21 is allowed to change, that is rise or fall, at step 33, for a first time duration, such as twenty seconds, or until the pressure drops, or increases, by a particular amount, such as 1" $H_2O$. The reason that the pressure may increase, rather than fall, after the source is disconnected from the tank is that increase in pressure due to fuel effects in combination with a small or no leak in the tank may cause the pressure to rise. The pressure is monitored and periodically sampled for a second time duration, such as thirty seconds, has elapsed or until the pressure changes by a second particular amount, such as by 4" $H_2O$. This period is the leak-only decay pressure measurement period (L) during which a first set of pressure measurements is made.

At the completion of the leak only decay period pressure measurement period L, the pressure in the tank is returned to StartPressure at step 34. If the pressure in the tank has decreased, then source 11 is connected to the tank. If the pressure in the tank has increased, then drain solenoid 18 is activated. The reference orifice 24 is then opened at step 35 by control 25 by activating reference solenoid valve 17. The pressure is monitored at step 36 by pressure sensor 19 until a third time duration, such as thirty seconds, has elapsed or the pressure changes by a third particular amount, such as by 6" $H_2O$. This period is the leak-and-reference pressure measurement period (LR) during which a second set of pressure measurements is made.

A remaining time allowed for the test is calculated and the pressure is monitored with pressure sensor 19 until the remaining time has lapsed or a final pressure change, such as another 60%, has occurred. This period is the final decay (Final). A third set of pressure measurements are made at step 37 during the Final period. It should be understood that the various pressure measurement periods (L, LR and Final) could be performed in a different sequence, particularly if additional stabilization periods are provided. After the Final period, drain solenoid 18 is operated and apparatus 10 is removed from the fuel system.

From the first, second and third sets of pressure measurements, control 25, which may include an auxiliary computer, computes a leakage parameter of the fuel system at step 38. The leakage parameter may be leak rate, area of the leak, leak diameter, or another parameter that represents the leakage of the fuel system. In addition, the volume of space above fuel in the tank may be calculated. While it is not necessary to know the volume to calculate the leakage parameter, certain testing authorities require this information to be recorded. It should be understood that calculation of volume is not a necessary part of the invention.

One set of mathematical algorithms for calculating a leakage parameter will now be set forth. It should be understood that other algorithms may be used and that certain aspects of the disclosed algorithms are presented for a better understanding of the process and are not necessarily utilized in the calculation.

The algorithms are based on the ideal gas law:

$$PV=nRT \qquad \text{Equation 1}$$

Where
P=Absolute pressure
V=Volume
n=Number of moles or molecules
R=Real gas constant
T=Absolute temperature The use of the present apparatus 10 under constant conditions produces the equation that correlates the system under two conditions as:

$$\frac{P_1}{N_1} = \frac{P_2}{N_2} \qquad \text{Equation 2}$$

Where
$P_1$=Starting pressure
$P_2$=Ending decayed pressured
$N_1$=Starting number of molecules
$N_2$=Ending number of molecules The decay from a leak of molecules translates to:

$$N_2=N_1-N_{Leak} \qquad \text{Equation 3}$$

Substituting and rearranging yields:

$$N_{Leak} = N_1\frac{(P_1 - P_2)}{P_1} \qquad \text{Equation 4}$$

The leak rate is:

$$LeakRate = \frac{N_{Leak}}{\text{Time}} \qquad \text{Equation 5}$$

Equation 6 describes the ratio of the leak flow, the reference flow, and the vapor flow.

$$K = \frac{Q_{Leak} - Q_{Fuel}}{Q_{Reference} + Q_{Leak} - Q_{Fuel}} \qquad \text{Equation 6}$$

K is the L decay rate divided by the LR decay rate. Solving for $Q_{Leak}$ yields:

$$Q_{Leak} = \frac{K\cdot(Q_{Reference} - Q_{Fuel}) + Q_{Fuel}}{1 - K} \qquad \text{Equation 7}$$

The intersection of the first and second sets of pressure measurements for the L and LR periods are determined by finding the periods of time that the decays have common pressure readings. The slopes of decays can then be determined for an interval, such as a one second interval, surrounding the average common pressure. As observed above, the ratio K is the L decay rate divided by the LR decay rate.

The final pressure, namely the pressure value at the end of the Final period, is needed to determine the fuel effects (Qf). The first step to determine this value is to perform a linear regression analysis on the entire decay of LR and Final periods. The regression is applied to the rate of decay versus square root of pressure. The final pressure is the x intercept value. The characteristics of the pressure drop of the reference orifice are calibrated to a known leak so that the tank leak can be quantified relative to a known standard. In the following equations, the fuel effects are computed for an intersecting point of two decays Qr1 and Qa1. The script “1” is to distinguish from flows known at a specific reference point, such as, for example, 15" $H_2O$. Such reference point is a known flow for pressure, temperature and orifice size. Basic flow relationship equations provide the values at other points.

Equation 8 is a basic flow relationship.

$$LeakDiameter = ReferenceDiameter * \sqrt{\frac{Ql}{Qr}} \qquad \text{Equation 8}$$

Equation 9 is the sum of flows from the pneumatic diagram of FIG. 1.

$$Ql = Qa + Qf \qquad \text{Equation 9}$$

$$Qf = (Qr1 + Qa1) * \sqrt{\frac{FinalPressure}{IntersectionPressure}} \qquad \text{Equation 10}$$

$$Qr1 = Qr * \sqrt{\frac{IntersectionPressure}{ReferencePressure}} \qquad \text{Equation 11}$$

$$Qa1 = Qr1 * K/(1-K) \qquad \text{Equation 12}$$

The fuel vapor pressure contribution is removed from the measured pressure to achieve a compensated pressure. The compensated pressure minimizes fuel effects. As a result of these mathematical relationships, the leakage parameter, effective leak diameter, may be calculated. This calculation does not require knowledge of the volume of the fuel tank.

As will be described in more detail below, tank volume can also be computed because the leak rate with a known volume can be measured. Further calculations may include verifying valid and stable conditions because leak rates for computed volume may not agree with the volume determined from the amount of air injected into the tank.

Computing a linear equation of form y=mx+b allows the slope and intercept to be computed without having to store each point. Memory can be saved by accumulating the following statistical elements:

| N | Count of entries |
|---|---|
| Σx | Sum x |
| $\Sigma x^2$ | Sum of $x^2$ |
| Σy | Sum of y |
| $\Sigma y^2$ | Sum of $y^2$ |
| Σx * y | Sum of x * y |

Equation 13 provides a way to efficiently compute the linear regression of pairs of points. Other ways of determining a slope are possible:

$$m = \frac{\frac{\sum x * y}{N} - \bar{x} * \bar{y}}{\sigma_x^2} \qquad \text{Equation 13}$$

Where:

$$\sigma_x^2 = \frac{\sum x^2}{N} - \bar{x}^2$$

b=Y−m*x at some point (x, y) such as first or last saved point

With this representation, the comparison can be made based on the curve k value or the instantaneous decay rate value derivative at a specified pressure.

The present invention may be carried out by measuring leakage due to a tank leak alone from a pressure change from a first pressure level to a second pressure level and measuring leakage due to the tank leak and the reference orifice from a third pressure level that is lower (or higher) than the first and second pressure levels to a fourth pressure level. The pressure trend of the fuel system with fuel in the tank may be measured and characterized before pressurization occurs.

An optional computation of volume of the fuel tanks is based on the ideal gas law rearranged to solve for volume using Equation 14.

$$V = \frac{N}{P} * R * T \qquad \text{Equation 14}$$

And then replacing the ratio of N/P with the ratio of a delta as in Equation 15.

$$V = \frac{\Delta N}{\Delta P} * R * T \qquad \text{Equation 15}$$

Where ΔP is the difference between two points during the fill and ΔN is the change in moles associated with the change in pressure. In this way the leak and fuel effects can be included into the computation using Equation 16.

$$\Delta N = \frac{Qfill - Qleak + Qfuel}{LitersPerMole * TimeperiodofDelta} \qquad \text{Equation 16}$$

Changes and modifications in the specifically described embodiments can be carried out without departing from the principles of the invention, which is intended to be limited only by the scope of the appended claims, as interpreted according to the principles of patent law including the doctrine of equivalents.

I claim:

1. A method of measuring leakage of a vehicle fuel system, comprising the steps of:

providing an apparatus having a gas source, a pressure meter and a reference orifice and connecting said apparatus to the fuel system;

pressurizing the fuel system with said source;

obtaining with said pressure meter a first set of pressure measurements during a pressure change of the fuel system without said reference orifice connected with the fuel system; obtaining with said pressure meter a second set of pressure measurements during a pressure change of the fuel system with said reference orifice connected with the fuel system; calculating a leakage parameter of the fuel system from the first and second sets of pressure measurements; and compensating said leakage parameter for fuel vapor pressure of fuel in the fuel system fuel tank.

2. The method of claim 1 further including connecting said apparatus with a filler neck of a fuel system tank and closing off hoses leading from the fuel system tank.

3. The method of claim 1 wherein said compensating further includes obtaining measurements of the effects of vapor pressure created by the fuel in the fuel system fuel tank.

4. The method of claim 3 wherein said compensating further includes mathematical processing of at least one of said first and second sets of pressure measurements and an additional pressure measurement of said fuel system.

5. The method of claim 1 further including discontinuing said pressurizing prior to obtaining said first and second sets of pressure measurements.

6. The method of claim 1 wherein said first and second sets of pressure measurements are made during an interval defined by the first to occur of a given pressure change and a given lapse of time.

7. A method of measuring leakage of a vehicle fuel system, comprising the steps of:

providing an apparatus having a gas source, a pressure meter and a reference orifice and connecting said apparatus to the fuel system;

pressurizing the fuel system with said source;

obtaining with said pressure meter a first set of pressure measurements during a pressure change of the fuel system without said reference orifice connected with the fuel system: obtaining with said pressure meter a second set of pressure measurements during a pressure change of the fuel system with said reference orifice connected with the fuel system; and calculating a leakage parameter of the fuel system from the first and second sets of pressure measurements, wherein said calculating further includes calculating slopes of curves defined by said first and second sets of pressure measurements at a pressure value that is common to said first and second sets of pressure measurements.

8. The method of claim 7 further including pressurizing the fuel system with said source to a particular pressure;

obtaining with said pressure meter the first set of pressure measurements;

returning the fuel system to said particular pressure after obtaining the first set of pressure measurements; and obtaining with said pressure meter the second set of pressure measurements.

9. The method of claim 8 further including connecting said apparatus with the filler neck of the fuel system tank and closing off hoses leading from the fuel system tank.

10. The method of claim 9 further including compensating said leakage parameter for fuel vapor pressure of fuel in the fuel system fuel tank.

11. The method of claim 10 wherein said compensating further includes obtaining a measurements of effects of vapor pressure created by the fuel in the fuel system fuel tank.

12. The method of claim 11 wherein said compensating further includes mathematical processing of at least one of said first and second sets of pressure measurements and an additional pressure measurement of said fuel system.

13. The method of claim 8 further including discontinuing said pressurizing prior to obtaining said first and second sets of pressure measurements.

14. The method of claim 8 wherein said first and second sets of pressure measurements are made during an interval defined by the first to occur of a given pressure change and a given lapse of time.

15. The method of claim 8 wherein said calculating includes calculating slopes of curves defined by said first and second sets of pressure measurements at a pressure value that is common to said first and second sets of pressure measurements.

16. A method of measuring leakage of a vehicle fuel system, comprising the steps of:

providing an apparatus having a gas source, a pressure meter and a reference orifice and connecting said apparatus to the fuel system;

pressurizing the fuel system with said source;

obtaining with said pressure meter a first set of pressure measurements during a pressure change of the fuel system without said reference orifice connected with the fuel system; obtaining with said pressure meter a second set of pressure measurements during a pressure change of the fuel system with said reference orifice connected with the fuel system; measuring an effect of fuel vapor pressure created by fuel in the vehicle fuel system; and calculating a leakage parameter of the fuel system from said first and second sets of pressure measurements including compensating for the effect of fuel vapor pressure.

17. The method of claim 16 wherein said compensating further includes making at least one additional pressure measurement of said fuel system.

18. The method of claim 17 wherein said compensating further includes calculating a fuel effect value from said at least one additional pressure measurement and at least one of said first and second sets of pressure measurements.

19. The method of claim 18 wherein said compensating further includes performing a linear regression on said at least one additional pressure measurement and said at least one of said first and second sets of pressure measurements.

20. The method of claim 16 wherein said first and second sets of pressure measurements are made during an interval defined by the first to occur of a given pressure change and a given lapse of time.

21. The method of claim 16 wherein said calculating further includes calculating slopes of curves defined by said first and second sets of pressure measurements at a pressure value that is common to said first and second sets of pressure measurements.

22. A vehicle fuel system leakage measurement apparatus, comprising:

a gas source, a pressure meter, a reference orifice and a control;

said control connecting said gas source to the fuel system and pressurizing the fuel system with said source;

said control selectively connecting said reference orifice to the fuel system;

said pressure meter obtaining a first set of pressure measurements during a pressure change of the fuel system without the reference orifice connected with the fuel system; said pressure meter obtaining a second set of pressure measurements during a pressure change of the fuel system with said reference orifice connected with the fuel system; and said control calculating a leakage parameter of the fuel system from said first and second sets of pressure measurements, further including compensating said leakage parameter for fuel vapor pressure of fuel in a fuel system fuel tank.

23. A vehicle fuel system leakage measurement apparatus comprising:

a gas source a pressure meter a reference orifice and a control;

said control connecting said gas source to the fuel system and pressurizing the fuel system with said source;

said control selectively connecting said reference orifice to the fuel system;

said pressure meter obtaining a first set of pressure measurements during a pressure chance of the fuel system without the reference orifice connected with the fuel system;

said pressure meter obtaining a second set of pressure measurements during a pressure change of the fuel system with said reference orifice connected with the fuel system; and said control calculating a leakage parameter of the fuel system from said first and second sets of pressure measurements further including calculating slopes of curves defined by said first and second sets of pressure measurements at a pressure value that is common to said first and second sets of pressure measurements.

* * * * *

UNITED STATES PATENT AND TRADEMARK OFFICE

CERTIFICATE OF CORRECTION

PATENT NO. : 7,347,082 B1
APPLICATION NO. : 11/068288
DATED : March 25, 2008
INVENTOR(S) : Bruce R. Kohn It is certified that error appears in the above-identified patent and that said Letters Patent is hereby corrected as shown below:

Column 7:
Line 35, Claim 7, ":" should be --;--.

Column 9:
Line 6, Claim 23, Insert --,-- after "apparatus".
Line 8, Claim 23, Insert --,-- after "source".
Line 8, Claim 23, Insert --,-- after "meter".
Line 15, Claim 23, "chance" should be --change--.

Signed and Sealed this

Eighteenth Day of November, 2008

JON W. DUDAS
*Director of the United States Patent and Trademark Office*